July 9, 1940.  G. HÜBNER ET AL  2,207,294
COMPRESSIBLE SPRAYING RECEPTACLE
Filed March 3, 1939
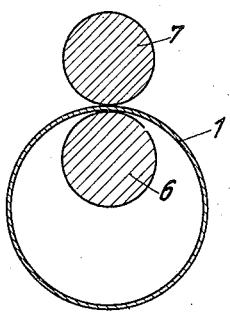
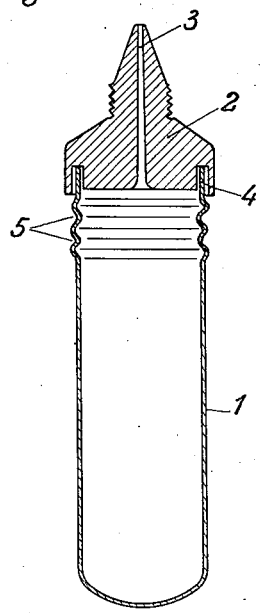
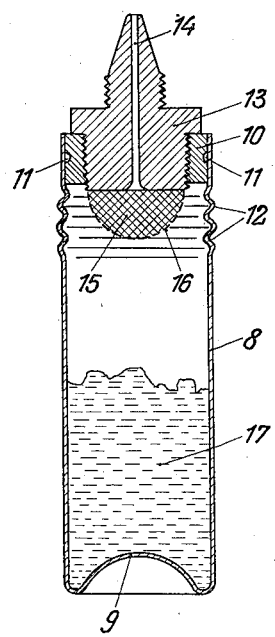
Inventors:
Gustav Hübner and Werner Friedrichs
By Karl Nau
Attorney Patented July 9, 1940

2,207,294

UNITED STATES PATENT OFFICE 2,207,294

COMPRESSIBLE SPRAYING RECEPTACLE

Gustav Hübner and Werner Friedrichs, Berlin, Germany

Application March 3, 1939, Serial No. 259,573
In Germany May 19, 1938

3 Claims. (Cl. 221—60)

Elastic bottles of rubber have become known consisting of a seamless rubber vessel being open at one end and having secured thereto a rigid head by cementing the free rim of the vessel in a circumferential groove in said head. These rubber vessels are comparatively heavy and expensive to manufacture. Owing to the chemical affectibility of the rubber they cannot be filled with acidic or alkaline substances. Besides, they cannot be stored for a long time without the rubber becoming hard and brittle.

Furthermore, elastic bottles are known consisting of an acetyl-cellulose vessel provided with a head piece clamped, pressed, shrunk or screwed thereon. Bottles of this kind could not, however, be completely sealed. In consequence thereof aqueous liquids were liable to evaporate in a short time while oil may even penetrate through the connecting joint. It has already been attempted to tighten the connecting joint of such bottles by means of a suitable cement. If the vessel serves as a spraying device and therefore, is subject to frequently repeated and strong deformation in practical use, cracks and fine rents occur in the cement joint which again may render the vessel untight.

Our invention relates to a compressible receptacle for spraying liquid or pulverulent substances formed of a seamless, thin-walled and elastic tubular vessel, consisting of a reversible cellulose derivate or a reversible artificial resin, and having a substantially U-shaped longitudinal section. The vessel is provided at its open end with a head piece firmly connected to it by a joint formed either by a cement or at least tightened thereby. According to our invention the vessel is formed with corrugations accordion-fashion within a short zone immediately adjacent to the connecting joint. By these means a highly elastic zone is inserted between the elastic but resistant body of the vessel and the cement joint, preventing the latter from becoming damaged when the main vessel body is compressed.

Our invention is illustrated diagrammatically and by way of example by the accompanying drawing of which:

Figure 1 represents an axial cross-section of a new receptacle intended especially for spraying liquids, Figure 2 represents in a similar way a modified constructional form intended especially for spraying pulverulent substances, and Figure 3 is a transverse section through a mechanical device for producing the above-mentioned corrugations in the open rim of the receptacle.

Referring first to Figure 1, numeral 1 denotes a thin-walled vessel having a substantially U shaped longitudinal section and consisting, for instance, of acetyl-cellulose, or of a reversible artificial resin, such as polymerised polistyrol or vinyl ester. The open end of the vessel 1 is closed by a rigid head piece 2 having at its free end a spraying nozzle 3 onto which a cap (not shown) can be screwed. If the receptacle filled with a liquid is held in an inclined position and compressed, the liquid will be ejected out of the nozzle 3 in the form of a vigorous jet.

The vessel may be manufactured with the required thin walls advantageously by means of a dipping method. By using this well-known method of manufacture the vessels become particularly uniform and highly resistant thin walls are obtained. The thickness of the walls may be chosen between 0.1 and 0.5 mm., which will insure sufficient strength and resistance, as well as adequate deformability.

The rigid head piece 2 preferably is made of an irreversible artificial resin, as for instance a phenol condensation product and is provided with a narrow circumferential groove 4 fitting accurately the rim of the vessel 1. In order to join the vessel 1 and the head piece 2 in an absolutely tight manner, the head piece 2 is placed in an inverted position and its groove 4 filled with pulverulent shellac. The head piece is then heated by contact with a hot metal plate until the cement has been fused, whereupon the rim of the likewise inverted vessel 1 is introduced from above into the groove 4 filled with molten cement. Then the parts are removed from the hot plate and allowed to cool. It has been found that the body and the head are securely and absolutely tightly joined with one another by this process.

The connection between the vessel 1 and the head piece 2 becomes particularly rigid and resistant if a small percentage of paraffin is added to the shellac. This may be accomplished in a simple manner by dipping the rim of the vessel 1 into molten paraffin immediately before inserting it into the fused shellac contained in the groove 4.

According to Figure 1 a short ring-like zone of the vessel 1 immediately adjacent to the cement joint is formed with corrugations 5. These corrugations may be produced, for instance, by subjecting the respective portion of the vessel to the action of rollers 6 and 7, as shown in Figure 3, said rollers having their circumferential surfaces formed alternately with grooves and elevations, the elevations of the one roller engaging the grooves of the other roller, and conversely, while leaving between them a space corresponding to the thickness of the wall of the vessel 1. The rollers are heated to a temperature below 200° C. which is the point at which the walls of the vessel 1 become plastic, but not sticky, if the portion to be corrugated is inserted between the rollers.

Our modified device, illustrated in Figure 2 is suited especially for spraying a pulverulent substance. It may be assumed that the vessel 8 has been manufactured by use of the well-known dipping method. After drying, the bottom 9 of the vessel 8 is bulged inwardly by pressing the vessel against a heated die in such a manner the finished receptacle can be placed in an upright position on a table or the like.

The head piece of the receptacle shown in Figure 2 consists of a rigid ring 10, made of irreversible artificial resin or the like, upon which the upper rim of the vessel is shrunk in a known manner. In the outer circumferential wall of the ring 10 there is provided a groove 11 containing shellac for securing the connection. The shellac is introduced into the groove in a molten state before shrinking the body onto the said ring. Having shrunk the upper rim of the vessel 8 onto the ring 10, the ring is carefully heated in order to re-fuse the shellac in the groove 11. The fused shellac will now enter by capillary action into all cracks and rents of the joint whereby an absolutely reliable secure joint will be obtained.

The accordion-like corrugations 12 may be produced in the manner described hereinabove. They also serve to produce a highly elastic protective zone serving to take up the tensile stress arising when the receptacle is deformed, and to protect the cement joint from being damaged by these forces.

Into the ring 10 there is screwed a head piece 13 the tapered end of which forms a spraying nozzle 14. A foraminous member 15 is arranged at the bottom face of the head piece 13 having large pores and being constituted, for instance, by a mass of glass-wool held in place by a suitably shaped screen 16. If the aforedescribed receptacle is shaken, a certain quantity of the enclosed pulverulent substance 17 will penetrate the holes of the screen 16 and adhere thereto which constitutes a sort of adhesion body. This substance will then be blown through the nozzle 14 in the form of a jet when the body of the vessel 8 is compressed such as by folding it between the thumb and the forefinger. When the receptacle is not in use, the nozzle 14 may be closed by a cap (not shown) screwed upon it.

We claim:

1. A spraying receptacle comprising in combination a rigid dispensing head tapering into a spraying nozzle, and an elastic tubular vessel closed at one end, the open rim of said vessel being affixed to said head by a cement joint, said vessel having a short zone of increased elasticity constituted by accordion-like corrugations immediately adjacent to said cement joint.

2. A spraying receptacle comprising in combination, a dispensing head terminating in a spraying nozzle and having a circumferential groove, a tubular vessel closed at one end and consisting of an elastic material, said vessel having a short accordion-like corrugated zone immediately adjacent to its open rim, said rim engaging said groove to effect a tight joint between said vessel and said dispensing head.

3. A spraying receptacle comprising in combination, a rigid dispensing head tapering into a spraying nozzle, a tubular vessel closed at one end and consisting of an elastic material having a short accordion-like corrugated zone immediately adjacent to its open rim, said rim being affixed to said dispensing head by a cement joint, and a foraminous member secured to said dispensing head and intervening between said spraying nozzle and the inner space of said vessel.

GUSTAV HÜBNER.
WERNER FRIEDRICHS.